United States Patent [19]
Lee et al.

[11] 3,833,405
[45] Sept. 3, 1974

[54] PROCESS FOR THE PRODUCTION OF FILM BASE MATERIAL

[75] Inventors: Edward William Lee; Keith Reid Tatchell; Kenneth John Challis; Kenneth Archibald Cockerton, all of Ilford, England

[73] Assignee: Ilford Limited, Ilford, Essex, England

[22] Filed: Aug. 15, 1972

[21] Appl. No.: 280,895

Related U.S. Application Data
[63] Continuation-in-part of Ser. No. 113,615, Feb. 8, 1971, Pat. No. 3,701,680.

[30] Foreign Application Priority Data
July 12, 1972 Great Britain .................... 32492/72

[52] U.S. Cl. ............. 117/76 F, 96/87 R, 117/47 A, 117/83, 117/138.8 F, 260/47 EP
[51] Int. Cl. ...................... B32b 27/36, G03c 1/80
[58] Field of Search ........... 117/47 A, 76 F, 138.8 F, 117/161 ZB; 96/87 R

[56] References Cited
UNITED STATES PATENTS

| | | | |
|---|---|---|---|
| 3,177,089 | 4/1965 | Marshall et al. ...................... | 117/72 |
| 3,177,090 | 4/1965 | Bayes et al. ........................... | 117/72 |
| 3,238,087 | 3/1966 | Norwalk et al. ...................... | 117/75 X |
| 3,377,168 | 4/1968 | Mally et al. ............................. | 96/83 |
| 3,539,378 | 11/1970 | Shephard et al. .................. | 117/47 A |
| 3,620,812 | 11/1971 | Boutle et al. ........................ | 117/76 F |

*Primary Examiner*—Ralph Husack
*Attorney, Agent, or Firm*—Cushman, Darby & Cushman

[57] ABSTRACT

Process for the production of film base material wherein one side of a film of synthetic linear polyester is treated with an organic solvent solution of a phenolic adhesion promoting agent, the solvent is removed, the so-treated side is coated with an organic solvent solution of a phenoxy resin which has been partially esterified with an organic polycarboxylic acid and the solvent is removed, the phenoxy resin having the formula

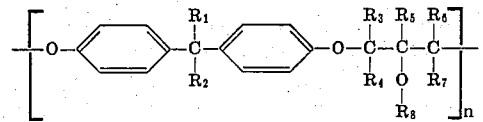

wherein each of $R_1 - R_7$ is a hydrogen atom or a lower alkyl or cyclohexyl group, $R_8$ is a hydrogen atom or represents the acyl residue of a partial ester of an organic polycarboxylic acid, $n$ is at least 50, and from 10 to 95% of the $R_8$ groups are said acyl residue.

7 Claims, No Drawings

PROCESS FOR THE PRODUCTION OF FILM BASE MATERIAL

This invention relates to synthetic film materials, and more particularly to film base materials of use in the production of photographic materials and is a continuation-in-part of our application Ser. No. 113,615 which was filed on Feb. 8, 1971 entitled "Plastics Film Material" and now U.S. Pat. No. 3,701,680.

It is known that self-supporting films formed of synthetic linear polyesters, particularly of the polyesters formed by reaction of ethylene glycol and terephthalic acid, may be prepared with mechanical and physical and chemical properties which, for example, render them very suitable indeed as base materials on which may be coated silver halide photographic emulsion layers for the production of photographic film materials.

However, since such base materials are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so-called "subbing" layers) between the film base and the emulsion layer, but the materials hitherto suggested for this purpose in connection with other film bases have not always proved entirely satisfactory when applied to film base of synthetic linear polyesters of highly hydrophobic character.

It is an object of the present invention to provide a new method of subbing synthetic linear polyester film base to render it adapted to accept, and hold strongly adherent to it, a layer of a more hydrophilic nature, e.g., one having a basis of gelatin, such as a gelatino silver halide emulsion layer.

According to the present invention there is provided a process for the production of film base material which comprises treating one side of a film of synthetic linear polyester of highly hydrophobic character with an organic solvent solution of a phenolic adhesion promoting agent, removing the solvent and coating on to the treated side an organic solvent solution of a phenoxy resin which has been partially esterified with an organic polycarboxylic acid, the phenoxy resin having the general formula I:-

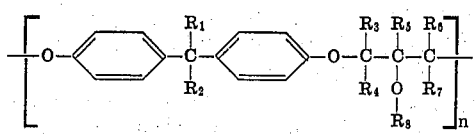

wherein each of $R_1 - R_7$ is a hydrogen atom or a lower alkyl or cyclohexyl group, $R_8$ is a hydrogen atom or represents the acyl residue of a partial ester of an organic polycarboxylic acid, $n$ is at least 50, and from 10 to 95% of the $R_8$ groups are a said acyl residue.

By lower alkyl group is meant an alkyl group having from 1 to 6 carbon atoms.

By "phenolic adhesion promoting agent" is meant a phenol based or naphthol based compound which is capable of acting on the polyester film base so as to render its surface more receptive to an applied layer. Examples of such compounds are m-cresol, o-cresol, resorcinol, orcinol, catechol, pyrogallol, 1-naphthol and such said compounds together with phenol which carry one or more chloro-, fluoro- or nitro-substituents. The action of the adhesion promoting agent on the polyester film base is thought to be a swelling action and polyester surfaces so treated are receptive to certain polymeric subbing layers but not to hydrophilic layers for example gelatin or polyvinyl alcohol. Thus in the process of the present invention the polymeric subbing layer comprises an organic polycarboxylic acid partial ester of a phenoxy resin of formula I.

In formula I it is preferred that $n$ is approximately 100. When $n$ is greatly in excess of 100 the compounds are not soluble in organic solvents and thus can not be used in the process of the present invention.

It is preferred that the compound of formula I is from 20-65% esterified. The preferred organic polycarboxylic acids with which to esterify the phenoxy resin are phthalic acid and trimellitic acid. Other suitable polycarboxylic acids are maleic acid and succinic acid.

The preferred partially esterified phenoxy resins for use in the process of the present invention have the following general formula II:

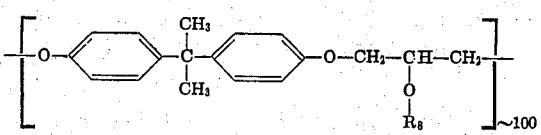

wherein $R_8$ is a hydrogen atom or is the partial ester of phthalic acid or of trimellitic acid, from 25-65% of the $R_8$ groups being the said partial ester.

A commercially available phenoxy resin of formula II where $R_8$ is entirely hydrogen is marketed by Union Carbide as PKDA 8500 phenoxy resin.

This resin can be converted to the phthalic half ester by reacting an organic solvent solution of the resin with phthalic anhydride in the presence of pyridine at an elevated temperature. For example a mixture which comprised 45 g. of PKDA 8500 phenoxy resin, 81 g. of pyridine, 72 g. of phthalic anhydride and 144 g. of methyl ethyl ketone was heated to 83°C. for 5 hours. The partially esterified phenoxy resin was recovered by adding hydrochloric acid to the mixture to precipitate it. The precipitated resin was washed in aqueous alcohol, redissolved in acetone and reprecipitated with alcohol.

This resin can be converted to the trimellitic 1/3 ester by reacting an organic solvent solution of the resin with trimellitic anhydride in the presence of pyridine at an elevated temperature. For example a mixture which comprised 25 g PKDA 8500 phenoxy resin, 120 mls pyridine, 20 g trimellitic anhydride, 150 mls dioxane, was refluxed for 5 hours. The partially esterified phenoxy resin was recovered by pouring the reactant mixture into dilute hydrochloric acid to precipitate the resin. The precipitated resin was washed in water, redissolved in methyl ethyl ketone and reprecipitated with a 50:50 isopropanol water mixture, washed with water and dried.

The film base material as prepared by the process of the present invention is able to accept a hydrophilic layer adherent thereto, for example a gelatin based layer, a polyvinyl alcohol layer or polyvinyl acetal layer.

The gelatin based layer may be a gelatino silver halide emulsion layer but usually when the process of the present invention is employed to prepare film base material for use in the production of photographic geltino silver halide material an intermediate gelatin layer is provided between the partial ester phenoxy resin layer and the gelatino silver halide emulsion layer. Such an intermediate layer is used in the examples which follow.

When the hydrophilic layer to be applied to the film base material as prepared by the process of the present invention is polyvinyl alcohol or polyvinyl acetal such a hydrophilic layer may comprise a light-sensitive diazonium salt to produce a diazotype material. Alternatively after a polyvinyl alcohol or polyvinyl acetal layer has been coated on to the film base material as prepared by the process of the present invention the polyvinyl alcohol or polyvinyl acetal may be surface hydrolysed and impregnated or coated with a light-sensitive diazonium salt to produce a diazotype material.

In general phenolic adhesion promoting agents which comprise nitro-, chloro- or fluoro-substituents produce a greater effect on the polyester than phenolic adhesion promoting agents without such substituents. Nevertheless in some cases it is preferred that the phenolic adhesion promoting agent employed in the process of the present invention comprises no nitro-, chloro- or fluoro- substituents. In such cases it is preferred that there is present in the organic solvent solution of the adhesion promoting agent a small amount of a mixed isophthalic-terephthalic resin. By small amount is meant about a tenth of the amount of phenolic compound present in the organic solvent solution.

A suitable mixed isophthalic-terephthalic polyester for use in this embodiment of the process of the present invention is sold under the Trade Mark of Vitel PE 200. This compound comprises 70% isophthalate and 30% terephthalate groups and is a polyester derived from a mixture of ethylene glycol and 1,4-butane diol.

The following Examples will serve to illustrate the invention.

EXAMPLE 1

The following coatings were applied to film based on the synthetic linear polyester obtained from ethylene glycol and terephthalic acid.

First coating:
| | | |
|---|---|---|
| p-Chloro-m-cresol | 2 | g. |
| Methylene chloride | 100 | ml. |
| dried 3 minutes at 105°C. | | |

Second coating:
| | | |
|---|---|---|
| Phthalic half ester of PKDA 8500 phenoxy resin which was 50% esterified | 2 | g. |
| Methyl ethyl ketone | 100 | ml. |
| dried 10 minutes at room temperature. | | |

Third coating:
| | | |
|---|---|---|
| Gelatin | 1 | g |
| Distilled water | 3 | ml |
| Salicylic acid | 0.2 | g. |
| Methanol | 45 | ml. |
| Ethyl lactate | 3 | ml. |
| 0.1% Chromic chloride in methanol | 1.5 | ml. |
| dried at 40°C for 2 hours. | | |

EXAMPLE 2

The following coatings were applied to film based on the synthetic linear polyester obtained from ethylene glycol and terephthalic acid.

First coating:
| | | |
|---|---|---|
| p-Chloro-m-cresol | 2 | g |
| Methanol | 100 | ml |
| dried 2 minutes at 70°C. | | |

Second coating:
| | | |
|---|---|---|
| Trimellitic ⅓ ester of PKDA 8500 phenoxy resin which was 40% esterified | 2 | g |
| Methyl ethyl ketone | 100 | ml |
| dried 5 minutes at room temperature. | | |

Third coating:
| | | |
|---|---|---|
| Gelatin | 1.0 | g |
| Copolymer of itaconic acid and methyl methacrylate | 0.6 | g |
| Distilled water | 3 | ml |
| Salicyclic acid | 0.2 | g |
| Methanol | 46 | ml |
| Acetone | 47 | ml |
| Ethyl lactate | 3 | ml |
| 0.1% Chromic chloride in methanol | 1.5 | ml |
| dried at 105°C for 15 minutes. | | |

EXAMPLE 3

The same polyester film used in Example 1 was coated with the following coatings.

First coating:
| | | |
|---|---|---|
| Mixed isophthalate-terephthalate polyester resin (Vitel PE 200) | 0.2 | g. |
| m-cresol | 2.0 | g. |
| Methylene chloride | 100 | ml. |
| dried 3 minutes at 105°C. | | |
| Second coating: as in Example 1. | | |
| Third coating: as in Example 1. | | |

Subsequently there was applied to the gelatin coating of the product of the three foregoing examples a layer of a conventional photographic gelatino silver halide emulsion. It was found that the layers were strongly adherent one to another and to the film support so that the final photographic film could be processed without danger of separation of the layers or frilling.

The invention also includes film base made by the processes of the present invention, photographic silver halide film material made using this film base and also diazotype material made using this film base.

We claim as our invention:

1. A process for the production of film base material which comprises treating one side of a film of synthetic linear polyester of highly hydrophobic character with an organic solvent solution of a phenolic adhesion promoting agent, removing the solvent, coating on to the treated side an organic solvent solution of a phenoxy resin which has been partially esterified with an organic polycarboxylic acid and again removing the solvent, the phenoxy resin having the formula:-

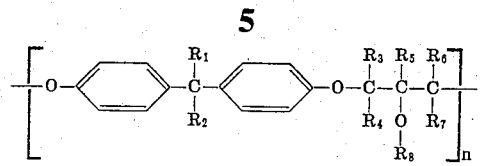

wherein each of $R_1 - R_7$ is a hydrogen atom or a lower alkyl or cyclohexyl group, $R_8$ is a hydrogen atom or represents the acyl residue of a partial ester of an organic polycarboxylic acid, $n$ is at least 50, and from 10 to 95% of the $R_8$ groups are a said acyl residue.

2. A process according to claim 1 wherein $n$ in the formula defined therein is between 95 and 105.

3. A process according claim 1 wherein the partially esterified phenoxy resin defined in claim 1 is esterified to the extent of 20–65%.

4. A process according to claim 1 wherein the organic polycarboxylic acid used to esterify the phenoxy resin is selected from phthalic acid, trimellitic acid, maleic acid and succinic acid.

5. A process according to claim 1 wherein the phenolic adhesion promoting agent is selected from $m$-cresol, $o$-cresol, resorcinol, orcinol, catechol, pyrogallol, 1-naphthol and such said compounds together with phenol which carry one or more chloro-, fluoro- or nitro-substituents.

6. A process for the production of film base material which comprises treating one side of a film of synthetic linear polyester of highly hydrophobic character with an organic solvent solution of a phenolic adhesion promoting agent, removing the solvent, coating on to the treated side an organic solvent solution of a phenoxy resin which has been partially esterified with an organic polycarboxylic acid and again removing the solvent, the phenoxy resin having the formula:

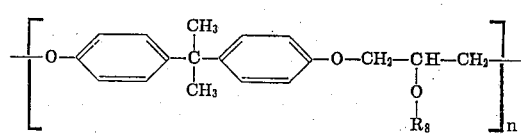

wherein $R_8$ is a hydrogen atom or is the partial ester of phthalic acid or of trimellitic acid, from 25–65% of the $R_8$ groups being the said partial ester and n is between 95 and 105.

7. A process according to claim 6 wherein the phenolic adhesion promoting agent is selected from $m$-cresol, $o$-cresol, resorcinol, orcinol, catechol, pyrogallol, 1-naphthol and such said compounds together with phenol which carry one or more chloro-, fluoro- or nitro-substituents.

* * * * *